Figure 1:
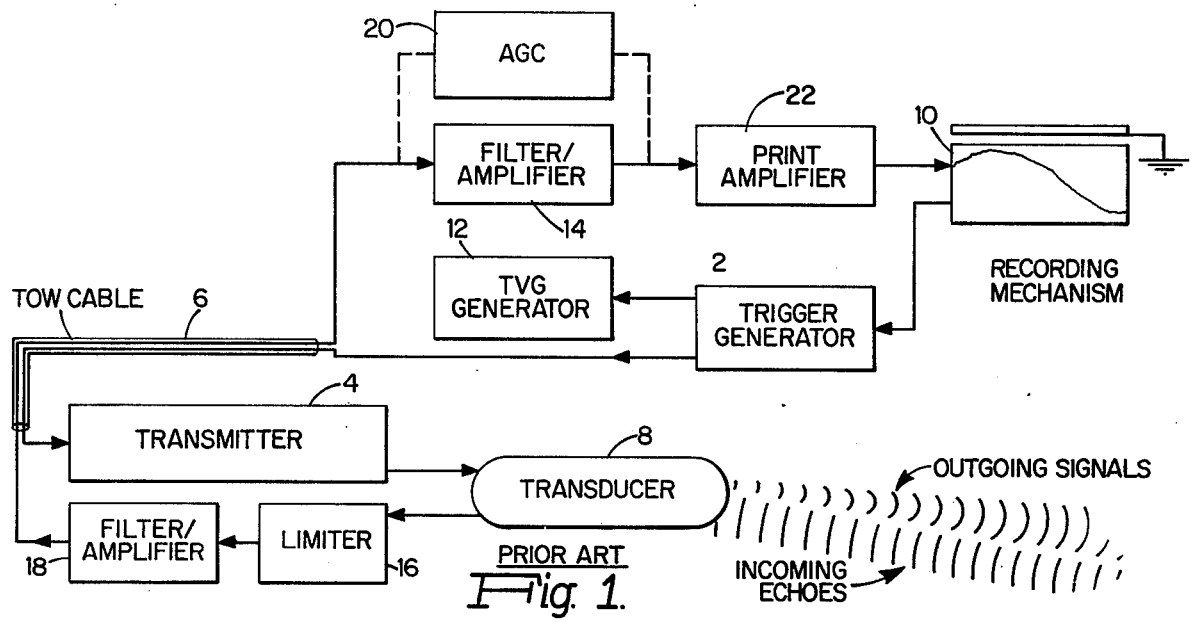

United States Patent [19]
Klein

[11] 3,975,704
[45] Aug. 17, 1976

[54] METHOD OF AND APPARATUS FOR SONAR AND RELATED SIGNAL TEXTURE ENHANCEMENT OF RECORDING MEDIA
[75] Inventor: Martin Klein, Salem, N.H.
[73] Assignee: Klein Associates, Inc., Salem, N.H.
[22] Filed: Nov. 4, 1974
[21] Appl. No.: 520,788

[52] U.S. Cl. .................................. 340/3 F; 333/14; 340/3 R; 346/33 EC
[51] Int. Cl.² ...................... G01S 9/66; G01D 9/00
[58] Field of Search ............................ 340/3 F, 3 R; 346/33 EC; 328/150, 171; 333/14

[56] References Cited
UNITED STATES PATENTS

| | | | |
|---|---|---|---|
| 3,058,110 | 10/1962 | Burns et al. | 340/3 F |
| 3,098,210 | 7/1963 | Sparling et al. | 340/3 F |
| 3,227,995 | 1/1966 | Rucklin | 340/3 F |
| 3,518,578 | 6/1970 | Oppenheim et al. | 333/14 |
| 3,629,813 | 12/1971 | Drenkelfort | 340/3 F |

Primary Examiner—Maynard R. Wilbur
Assistant Examiner—S. C. Buczinski
Attorney, Agent, or Firm—Rines and Rines

[57] ABSTRACT

This invention provides two dramatic improvements in the state of the art of side scan sonar systems and the like, bringing out the fine details of the sonar signals to enhance the texture of the sonar charts and to improve the quality and interpretability of the sonar records, while additionally bringing the sonar signals into the dynamic range of the recording medium in such a way that the tuning of the sonar instrument is greatly simplified and, in many situations, may be run continuously with no operator's adjustment of the instrument controls. These ends are attained through a novel compressed-signal absolute value smoothing and derivative processing, with dynamic range matching to the recording medium.

13 Claims, 3 Drawing Figures

METHOD OF AND APPARATUS FOR SONAR AND RELATED SIGNAL TEXTURE ENHANCEMENT OF RECORDING MEDIA

The present invention relates to sonar and similar signal processing and the like, being more particularly directed to methods of and apparatus for sonar and related signal texture enhancement on recording media.

For many years, side scan sonar systems (with which the invention will be primarily illustratively described) have had a serious limitation imposed by the relatively small dynamic range of the graphic recording displays which are used in the present art. The sonar signals may have a dynamic range of 120db or more, while the graphic recorder may only have a dynamic range of 20 to 40db.

In typical systems, single channel or multiple channel, a trigger pulse is generated each time the recorder begins a sweep; such trigger pulse turning on the transmitter electronics to apply a high-voltage pulse to the sonar transducers such that the transducers emit an acoustic pulse which is typically, but not limited to, a short high intensity sound burst with a beam pattern which is narrow in the horizontal plane and wide in the vertical plane. Such systems are described, for example, in my article, "Side Scan Sonar", appearing in the April, 1967 volume of *UnderSea Technology*. The amount of signal returning to the transducer is a function of a variety of parameters, being dependent upon the distance travelled by the sound path from the transducer to the bottom and back to the transducer. It is strongly dependent on the angle of incidence on the bottom, with signals at or near a 90° angle (the signals directly below the transducer), generally returning very strong reflection echoes. Signals at more shallow angles, however, are, in the main, bounced away from the transducer. In fact, at these shallow angles, the sound return (and, therefore, the signal level) is a function of the surface roughness or "backscatter". A very smooth bottom, thus, will return practically no signal at all at shallow incident angles. Other factors affecting the amount of signal return, include the transducer vertical beam pattern, the thermal effects of sound "ray bending", the sound absorption in the water column and a variety of lesser factors.

In view of all of these variables, the signals returning from the ocean or other floor tend to have an enormous dynamic range, often over a scale of 120db (one million to one), or more. In electrical terms, this can be translated into a range of, say, one volt to one microvolt. The overall dynamic range will generally be controlled by the strength of the strongest echo on one end, and the system noise level (which may be electrical or acoustic or a combination of both) on the low end. The noise level generally determines the level of the minimum detectable signal.

The recording means, however, have a typical dynamic range of 20 to 40db (10 to 1 or 100 to 1) in their intensity-modulation capabilities. Typical recording means in the present art include a cathode ray tube or a "facsimile" type chart recorder using electrosensitive or electrochemical recording paper.

In the prior art, including most typical systems today, means are provided to allow the operator to adjust the signal levels to compensate for such large variations in signal. These techniques involve the use of AGC (automatic gain control) and/or TVG (time-variable-gain) circuits, as described in my before-mentioned article, and in my paper published by the Twelfth Annual Canadian Hydrographic Conference, 27 February 1973-1 March 1973, entitled "New Developments In Side Scan Sonar For Hydrography" and the bibliographic references therein.

Such techniques, particularly TVG, may help a great deal; but they leave a variety of problems. For instance, an AGC can incorrectly react so as accidentally to ignore an important bottom feature. This can happen, say, when two strong bottom features are fairly close together across the sonar tow vehicle track. The first large target may produce a strong signal which activates the AGC and lowers the system gain. If the AGC response or decay time is incorrect, the second target may thus be missed. Since bottom conditions vary enormously, it is difficult to build an AGC that will react correctly in all situations. With a TVG circuit, moreover, a curve is typically generated which changes the sonar amplifier gain with time in order to compensate for the large signal variation. The problem with this technique above, however, is that the bottom conditions continue to change, for reasons previously described, so that the TVG curve must be continually adjusted. This adjustment involves a variety of controls on the instruments, and generally, a skilled operator is required constantly to monitor the instruments and to vary the controls to the best of his ability. Even the most skilled operator, however, cannot always adjust the controls to optimize the returns and the sonar record quality. In the typical situation, where the signals are not tape recorded for later playback and experimentation, incorrect settings will therefore cause a permanent loss of record quality.

An object of the present invention, accordingly, is to provide a new and improved method of and apparatus for sonar and related signal texture enhancement on recording media and the like that shall not be subject to the abovedescribed limitations; and wherein, in summary, a technique of signal processing is employed which compresses the signals into a range within the dynamic range of the recording means, and which, in addition, enhances the fine detail or texture of the signal returns, while further allowing for substantially uniform signal returns with, in most cases, no need for the operator continually to tune the instrument.

A further object is to provide a novel sidescan and other sonar signal processing and recording method and apparatus.

An additional object is to provide new and improved signal texture enhancement apparatus and/or automatic tuning systems of more general applicability, as well.

Other and further objects will be pointed out hereinafter, being more particularly delineated in the appended claims. In summary, however, the technique underlying the invention is suitably to employ the derivative of the smoothed absolute value of a compressed, amplified form of the sonar signal, bringing out the fine detail in the signal waveform and reducing the dynamic range of the signal, substantially to match the dynamic range of the recording means. Preferred details are hereinafter described.

Figure 2:
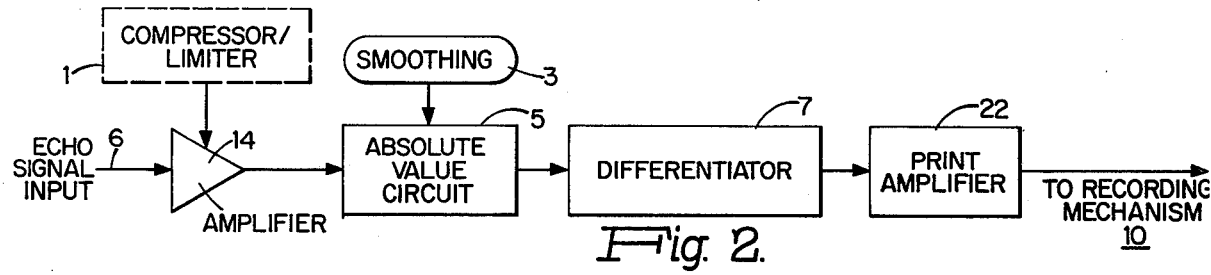
Figure 3:
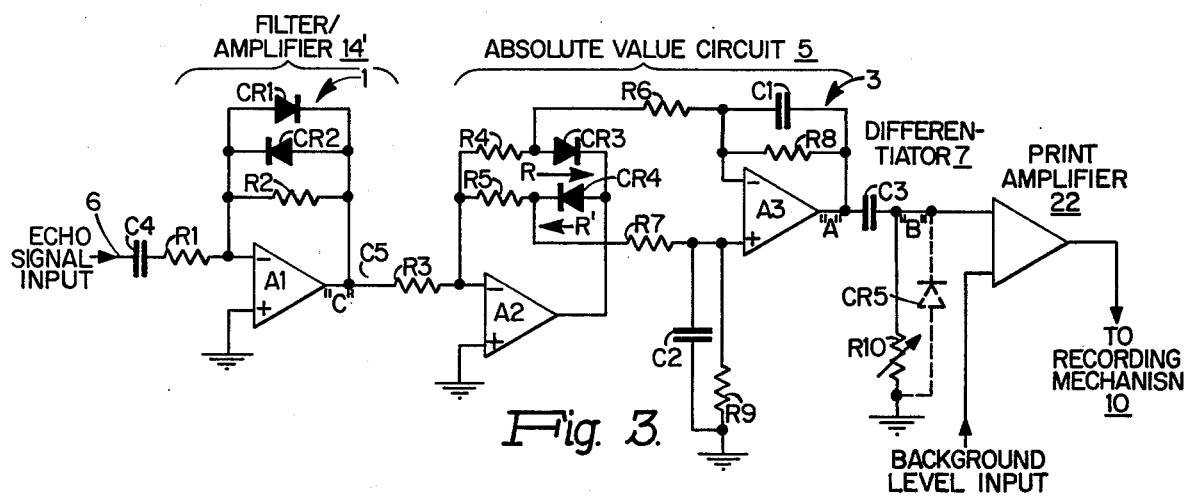

The invention will now be described with reference to the accompanying drawing, shown applied to the illustrative example of side scan sonar and the like, and FIG. 1 of which is a block diagram of a typical prior art sonar system, illustrating the circuit arrangement giving rise to the problems underlying the present invention;

FIG. 2 is a similar, simplified block diagram of a signal processing apparatus constructed in accordance with the technique of the present invention for use in the system of FIG. 1; and FIG. 3 is a schematic circuit diagram of a preferred form of the apparatus of FIG. 2.

Referring to FIG. 1, the before-mentioned trigger generator 2 is shown, controlled from, for example, a recording graph-type drum recorder 10, and triggering the pulse transmitter 4, through the underwater tow cable 6, to excite the transducer 8 being towed, in order to transmit the sonar pulses toward the bottom, labelled "Outgoing Signals", and then to receive the bottom reflections as the "Incoming Echoes". Simultaneously with such triggering, the previously described TVG generator 12 produces its time variable gain curve compensation for the filter amplifier system 14 that receives, as its input signal, the returned echo signals picked up by the transducer 8, in the period between transmitted pulse signals, and processed by the conventional limiter and preliminary filter-amplifier circuit 16 and 18, respectively. An AGC circuit is shown at 20, optionally employed in connection with the amplifier 14 in conventional fashion, to provide automatic gain control features for the signal applied to the print amplifier 22 that feeds the recorder 10—all with the limitations and disadvantages inherent therein, as previously detailed, and which the present invention obviates.

In accordance with the present invention, the processing system of FIG. 1 is rather radically conceptually and physically modified, as shown in FIGS. 2 and 3. Referring to FIG. 2, the echo signal fed upward along the tow line cables 6 is shown applied as input to the amplifier 14', which may be one or several stages and which is preferably operated with logarithmic compression and limiting at 1. The signal output is smoothed at 3 and its absolute value is obtained at 5, as more fully explained in connection with the detailed circuit of FIG. 3; the smoothed, absolute-value signal being differentiated to obtain its mathematical derivative at 7, and then being applied to the print amplifier 22. The reasons for this processing and illustrative details of its functions and how they may be effected, will now be explained in connection with the circuit diagram of FIG. 3, wherein the received signal echoes fed upward along the tow cable 6 are shown coupled via capacitor C4 and resistor R1 to the input of filter amplifier stage 14'. Polarities of the amplifier inputs are shown in FIG. 3.

While the absolute value of the signal may be obtained by a full wave rectifier or converter, or approximated by a half-wave rectifier, the circuit 5 of FIG. 3 employs a precision full-wave-rectifier comprising rectifiers CR3 and CR4 and amplifiers A2–A3. Capacitors C1 and C2 provide a smoothing function at 3, so that the rectifier output at "A" is basically the "envelope" of the sonar pulses. A simplified differentiator circuit is shown at 7 in the form of a well-known capacitor-resistor network, C3 and R10, with the signal appearing at point "B" being the derivative of the signal appearing at point "A". The signal at point "B" is then applied to the print amplifier 22 which may take many configurations according to the requirements of the printing mechanism of the graphic recorder 16. It should be noted, however, that most printing mechanisms are basically d.c. sensitive (sensitive in one polarity). In other words, they will, for instance, go from white to black with a positive-going pulse, but will have no reaction to a negative-going pulse, except to stay white. By proper selection of the component values in the circuit of FIG. 3, and by selection of the gain of the print amplifier 22, the signals can be controlled to have a relatively small dynamic range within the dynamic range of the print amplifier 22. This is accomplished because the smoothing 3 by C1 and C2, and the response of the capacitor-resistor type differentiator 7 can limit in a controlled manner the maximum rise and fall time of the signal envelope.

The technique is further improved by subjecting the signals in the initial amplifiers 14' to a logarithmic type compression. This is accomplished, as shown in simplified fashion, by opposite-polarity diodes CR1 and CR2 (labelled 1) which are placed in parallel with resistor R2 around the loop of the conventional operational amplifier stage A1, which is coupled through C5 and R3 to the rectifier circuit 5. This tends further to equalize the sonar signals and it prevents the amplifier from entering a saturation region in which the output would be "flat" and the derivative of the output at 7 would consequently be zero. Thus, a certain amount of bottom echoing detail may be obtained even in situations where signal levels are all relatively high (such as in a rocky bottom area). The gain of the full wave rectifier 5 must be set up, of course, so it cannot go into saturation for this technique to work properly; and this can be controlled, as is well known, by proper relative selection of resistors of the precision rectifier system 5, R3, R4, R5, R6, R7, R8, and R9. The technique may be further improved by making capacitor C3 or resistor R10 variable so that the rise and fall time of the differentiator 7 is controllable. This will, in effect, tend to control the amount of fine detail which will be seen in the final output, and will therefore act as a texture control.

The output of the differentiator circuit 7 (point "B"), will go negative when the envelope of the sonar signal is falling. This will keep the print amplifier 22 "off" and will, in most cases, improve the record contrast. However, in some cases, this effect creates false acoustic "shadows", as described in my first-mentioned article, which might confuse geologic interpretation. Such false shadows may readily be eliminated with the circuit of the present invention by insertion of diode CR5 to eliminate negative pulse swings.

In my second-named article, above, it is mentioned that sonar records could be optically reversed by changing white to black and black to white by photographic techniques. With the circuit of FIG. 3, such record reversal can now be readily made electronically, by reversing diodes CR3 and CR4 so that the output of the full-wave rectifier 5 swings negative instead of positive. This is schematically illustrated by the reversing arrows R and R' adjacent respective rectifiers CR3 and CR4. The background control on the print amplifier 22 can be turned up so that, with no signal, the paper is dark. Then, the negative-going signals turn the printing off to make the paper white. In this situation, CR5 can be installed and reversed, again to prevent false shadows.

Another additional benefit of the signal processing technique of the invention resides in the provision of a signal which is much easier to tape-record than the standard sonar signal. Consider, for example, the standard sonar signal appearing at point "C" in the output of amplifier 14'. This will be a high frequency (typically 100 KHz), fairly wide bandwidth (typically 10KHz) signal which is relatively difficult to tape record. Alternatively, consider the signal at "A" in the output of the absolute value rectifier circuit 5. This signal has a d.c. component and again a fairly wide bandwidth (typically 10 KHz), such that it is also relatively difficult to tape-record. The new signal at "B", however, in the output of differentiator circuit 7, is an a.c. signal, still of relatively wide bandwidth (typically 10 KHz), but this time shifted down to the low frequency-low dynamic range level which can readily be handled by a conventional audio tape recorder, much as it now substantially matches the dynamic range of the display recorder 10.

The invention, thus, embodies the novel combination of using the derivative of the smoothed, absolute value of an amplified, compressed, non-saturated sonar or related signal in order to bring out the fine detail in the signal waveform and to reduce the dynamic range of the signal substantially to match that of the recording means. With the circuit of FIG. 3 operating with the "Hydroscan" side scan sonar of Klein Associates of Salem, New Hampshire, for example, uniform bottom echoing records in the ocean have been consistently produced without the requirement for gain-setting or other tuning changes by an operator as the transducer passes through areas of widely varying signal conditions. Extremely fine textural discrimination between, for example, flat sand, sand waves or rippled patterns, rocky bottoms, and course gravel areas have been readily obtained, and previously unattainable detail, such as even the ribs of a shipwreck lying in a rocky shoal area, have been easily distinguished.

Conventional AGC and/or TVG circuits can still be applied to the amplifier 14', as in FIG. 1, to accomplish special goals; for instance, a TVG circuit can still be used to eliminate "clutter" from unwanted surface returns which may appear on the sonar records. While, moreover, the technique of the invention has been described for side scan sonar, it may readily be applied to echo sounders, sub-bottom profiling sonars, conventional sonars and other instrument systems which require similar signal compression without loss of detail. Further modifications will also occur to those skilled in this art and all such are considered to fall within the spirit and scope of the invention as defined in the appended claims.

What is claimed is:

1. A method of enhancing the texture of sonar and similar signals of relatively large dynamic signal range as recorded upon recording systems of relatively limited dynamic signal range, that comprises, receiving said signals; converting the received signals into corresponding absolute value signals; smoothing the same; differentiating the smoothed absolute value signals to produce derivative signals therefrom; controlling said differentiating to limit the rise and fall time of the derivative signals within a limited dynamic range of the intended recording of the signals; and recording the controlled derivative signals within said limited dynamic range in order to bring out fine textured signal detail while substantially matching the signal dynamic range to that of the recording.

2. A method as claimed in claim 1 and in which the received signals are compressed while being amplified prior to converting the same.

3. A method as claimed in claim 2 and in which the compression is effected substantially logarithmically to prevent saturation during the amplifying, for a wide range of signals.

4. A method as claimed in claim 1 and in which the further step is performed of restricting the derivative signals to one polarity in order to avoid the appearance of false signal shadows.

5. A method as claimed in claim 1 and in which the polarity of said converting is changed to reverse black-and-white signal recording.

6. A method as claimed in claim 5 and in which the derivative signals are restricted to one polarity in order to avoid the appearance of false signal shadows.

7. Apparatus for sonar and related signal texture enhancement on recording media having, in combination, means for generating sonar and related echo signals of relatively large dynamic signal range; means for receiving and amplifying said signals; means connected with the last-named means for converting the amplified signals into signals corresponding to the absolute value of the amplified signals, and for smoothing the same; means for differentiating the smoothed absolute value signals; recording means of relatively limited dynamic signal range; means for connecting the differentiating means to said recording means; and means for controlling the differentiating means to limit the rise and fall time of the derivative signals therefrom within said limited dynamic range in order to bring out fine textured signal detail on the recording means while substantially matching the limited dynamic range thereof.

8. Apparatus as claimed in claim 7 and in which said amplifying means comprises signal-compressing means.

9. Apparatus as claimed in claim 8 and in which said signal-compressing means is substantially logarithmic, in order to prevent saturation of the amplifying means over a wide range of signals.

10. Apparatus as claimed in claim 9 and in which said signal-compressing means comprises operational amplifier means containing opposite-polarity diode means in the amplifier loop thereof.

11. Apparatus as claimed in claim 7 and in which the said differentiating means is provided with diode means for restricting the polarity of the derivative signal output thereof to avoid false shadow recording.

12. Apparatus as claimed in claim 7 and in which means is provided for reversing the polarity of the converting means to reverse the black-and-white recording on the recording means.

13. Apparatus as claimed in claim 12 and in which said converting means comprises precision full-wave rectifier means.

* * * * *